(12) United States Patent
Takahara

(10) Patent No.: US 10,547,390 B2
(45) Date of Patent: Jan. 28, 2020

(54) OPTICAL TRANSMISSION DEVICE, OPTICAL TRANSMISSION SYSTEM, AND ALLOCATION METHOD

(71) Applicant: FUJITSU LIMITED, Kawasaki-shi, Kanagawa (JP)

(72) Inventor: Tomoo Takahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/982,164

(22) Filed: May 17, 2018

(65) Prior Publication Data

US 2018/0337735 A1 Nov. 22, 2018

(30) Foreign Application Priority Data

May 19, 2017 (JP) ................. 2017-100229

(51) Int. Cl.
*H04B 10/548* (2013.01)
*H04B 10/2507* (2013.01)
*H04L 27/26* (2006.01)
*H04B 10/079* (2013.01)

(52) U.S. Cl.
CPC ....... *H04B 10/548* (2013.01); *H04B 10/2507* (2013.01); *H04L 27/2628* (2013.01); *H04B 10/07953* (2013.01)

(58) Field of Classification Search
None
See application file for complete search history.

(56) References Cited

U.S. PATENT DOCUMENTS

2014/0153925 A1\* 6/2014 Nishihara ........... H04J 14/0226
14/226

FOREIGN PATENT DOCUMENTS

JP 2014-107854 6/2014

\* cited by examiner

*Primary Examiner* — David W Lambert
(74) *Attorney, Agent, or Firm* — Fujitsu Patent Center

(57) ABSTRACT

An optical transmission device includes: an optical transmitter that transmits, at a time of system activation, a control signal to another optical transmission device by using a plurality of subcarriers; and a controller that allocates a link communication channel (LCC) to a subcarrier, among the plurality of subcarriers, for which bare minimum transmission characteristic is obtained, based on a response to the control signal from the other optical transmission device.

6 Claims, 12 Drawing Sheets

OPTICAL TRANSMISSION DEVICE, OPTICAL TRANSMISSION SYSTEM, AND ALLOCATION METHOD

CROSS-REFERENCE TO RELATED APPLICATION

This application is based upon and claims the benefit of priority of the prior Japanese Patent Application No. 2017-100229, filed on May 19, 2017, the entire contents of which are incorporated herein by reference.

FIELD

The embodiment discussed herein is related to an optical transmission device, an optical transmission system, and an allocation method.

BACKGROUND

In recent years, due to increasing transmission traffic, there is a demand to increase the capacity of an optical transmission system. With respect to a short-distance transmission system, a low-cost, simple configuration is also demanded, in addition to a larger capacity.

Accordingly, application of a discrete multi-tone (DMT) modulation scheme to an optical transmission system is being considered. The DMT modulation scheme is one of multi-carrier transmission technologies based on an orthogonal frequency division multiplexing (OFDM) technology, and is used in a digital subscriber line (DSL) technology such as an asymmetric DSL (ADSL). Therefore, the DMT modulation scheme is referred to also as a "multi-carrier modulation scheme".

The DMT modulation scheme uses a technique called "bit loading", which allocates, to each subcarrier, number of bits according to transmission characteristics. The transmission characteristics may be referred to as "receiving characteristics" or "signal quality".

Example indices of transmission characteristics include optical signal-to-noise ratio (hereinafter referred to as "OSNR") and a bit error rate (BER). The transmission characteristics may be referred to also as a "transmission condition". For example, the DMT modulation scheme allocates a larger number of bits to a subcarrier with high transmission characteristics than to a subcarrier with low transmission characteristics. The DMT modulation scheme may thus increase a frequency use efficiency of a transmission band, and increase a transmission capacity.

Accordingly, by installing the DMT modulation scheme in an optical transmission system, the frequency use efficiency (i.e., transmission capacity) is increased, and miniaturization and reduction in cost may be achieved.

Patent Document 1: Japanese Laid-open Patent Publication No. 2014-107854

The DMT modulation scheme considers use of one or more subcarriers for realization of functions instead of for data transmission. The functions include a link communication channel (LCC). The LCC is used, at the time of activation of a system, for transmission of a control command (control signal) between an optical transmitter of a first optical transmission device and an optical receiver of a second optical transmission device, so as to reliably realize data transmission between the first optical transmission device and the second optical transmission device.

However, with the DMT modulation scheme, a subcarrier with a significantly deteriorated OSNR, i.e., transmission characteristics, is sometimes present. For example, such a dip in the transmission characteristics is caused by an influence of power fading which is due to a frequency chirp added in a transmission optical signal depending on frequency characteristics of a light source of the optical transmitter, and to dispersion to which the transmission optical signal is subjected in an optical transmission line.

In the case where there is a subcarrier with a dip in the transmission characteristics, it is not desirable to allocate the LCC to the subcarrier where a dip is caused in the transmission characteristics. If the LCC is allocated to the subcarrier where a dip is caused in the transmission characteristics, the OSNR may be significantly reduced, and the LCC is possibly not established. If the LCC is not established, activation of the system is prevented.

On the other hand, it is also not desirable to allocate the LCC to a subcarrier with very good transmission characteristics. A subcarrier which is allocated with the LCC is used to activate the system, and is not used for data transmission. That is, if the LCC is allocated to a subcarrier with very good transmission characteristics, transmission capacity is reduced or reception sensitivity is reduced, thereby affecting the transmission characteristics.

SUMMARY

According to an aspect of an embodiment, an optical transmission device includes: an optical transmitter that transmits, at a time of system activation, a control signal to another optical transmission device by using a plurality of subcarriers; and a controller that allocates a link communication channel (LCC) to a subcarrier, among the plurality of subcarriers, for which bare minimum transmission characteristic is obtained, based on a response to the control signal from the other optical transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

Additionally, the disclosed technology is not limited to the present embodiment. Furthermore, each embodiment described below may be combined as appropriate to the extent that no conflict exists.

Configuration of Optical Transmission System

Figure 1:
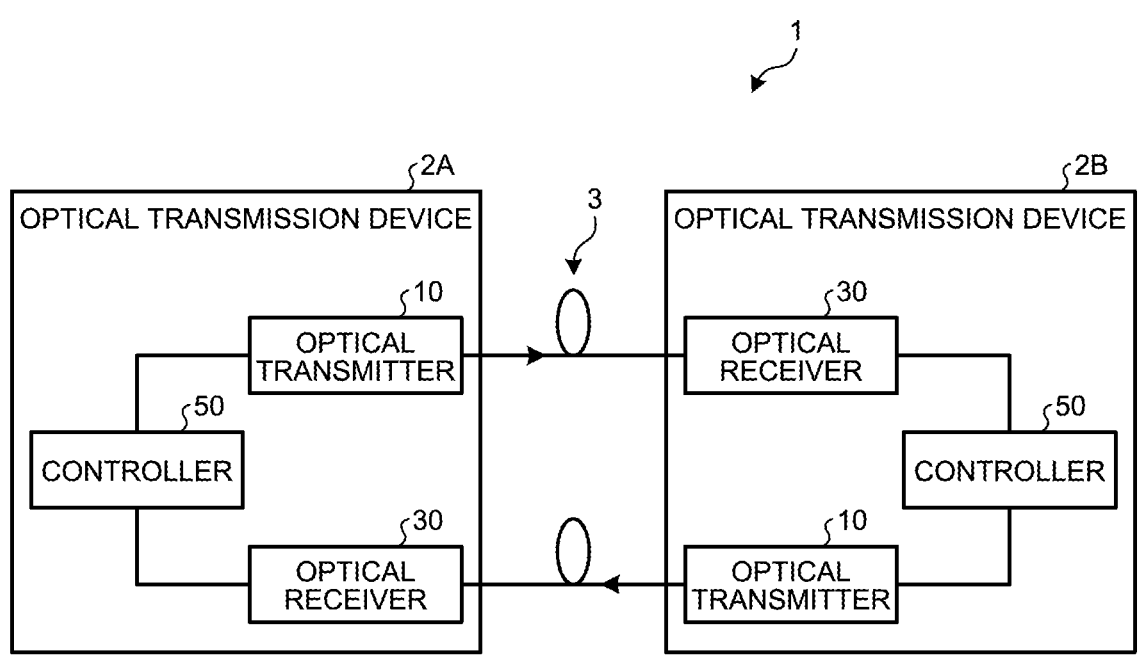
FIG. 1 is a block diagram illustrating an example configuration of an optical transmission system according to an embodiment.

FIG. 1 is a block diagram illustrating an example configuration of an optical transmission system 1 according to an embodiment. As illustrated in FIG. 1, the optical transmission system 1 includes optical transmission devices 2A, 2B.

Each optical transmission device 2A, 2B includes an optical transmitter 10, an optical receiver 30, and a controller 50. The optical receiver 30 is connected to the optical transmitter 10 by an optical transmission line 3. An optical transmission medium such as an optical fiber is used as the optical transmission line 3, and the optical transmission line 3 is provided with one or a plurality of optical amplifiers.

The optical transmitter 10 modulates transmission data by a discrete multi-tone (DMT) modulation scheme, and generates a DMT modulated signal. Then, the optical transmitter 10 converts the generated DMT modulated signal into an optical signal, and generates a DMT modulated optical signal. The DMT modulation scheme is an example of a multi-carrier modulation scheme, and the DMT modulated optical signal is an example of a multi-carrier modulated optical signal. The optical transmitter 10 transmits the generated DMT modulated optical signal to the optical transmission line 3.

The optical receiver 30 receives the DMT modulated optical signal from the optical transmission line 3, converts the received DMT modulated optical signal into an electrical signal, and generates a DMT modulated signal. Then, the optical receiver 30 demodulates the generated DMT modulated signal, and obtains received data.

The controller 50 controls the optical transmitter 10 and the optical receiver 30.

Configuration of Optical Transmitter

Figure 2:
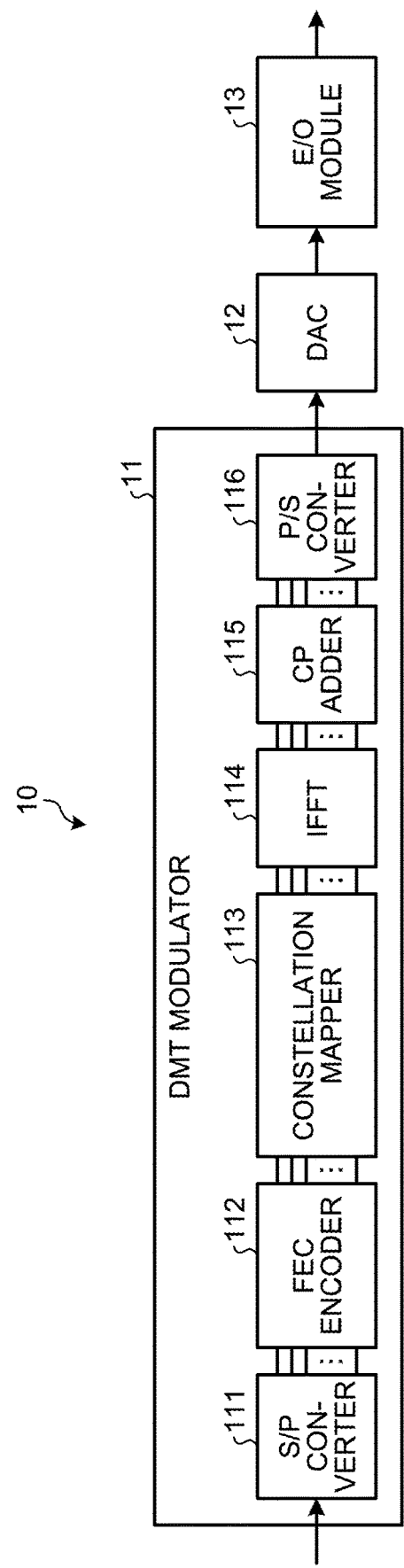
FIG. 2 is a block diagram illustrating an example configuration of an optical transmitter of the optical transmission system according to the embodiment.

FIG. 2 is a block diagram illustrating an example configuration of the optical transmitter 10 of the optical transmission system 1 according to the embodiment. The optical transmitter 10 includes a DMT modulator 11, a digital-to-analog converter (DAC) 12, and an electrical-to-optical conversion (E/O) module 13.

The DMT modulator 11 is an example of a multi-carrier modulator, and DMT-modulates transmission data, which is an electrical signal, and generates a DMT modulated signal. The DMT modulator 11 includes a serial-to-parallel (S/P) converter 111, a forward error correction (FEC) encoder 112, and a constellation mapper 113. Furthermore, the DMT modulator 11 includes an inverse fast Fourier transformer (IFFT) 114, a cyclic prefix (CP) adder 115, and a parallel-to-serial (P/S) converter 116. CP is referred to also as a "guard interval (GI)".

The S/P converter 111 S/P-converts transmission data, and generates pieces of parallel data according to the number of transmission subcarriers. The S/P converter 111 outputs the generated parallel data to the FEC encoder 112.

The FEC encoder 112 is an example of an error correction coder, and performs error correction coding on the parallel data output from the S/P converter 111. For example, as an error correction code, a low-density parity-check code (LDPC) or a turbo code is applied. The FEC encoder 112 outputs the parallel data which has been subjected to error correction coding to the constellation mapper 113.

The constellation mapper 113 maps parallel data (digital bit sequences) output from the FEC encoder 112 on symbols on a complex plane (IQ plane) referred to as "constellation" in units of subcarriers. Such mapping may be referred to also as "multi-carrier modulation" or "subcarrier modulation". As described above, the DMT modulation scheme is cited as an example of the multi-carrier modulation scheme, and thus, in the present embodiment, mapping mentioned above will be referred to as "DMT modulation".

Figure 3:
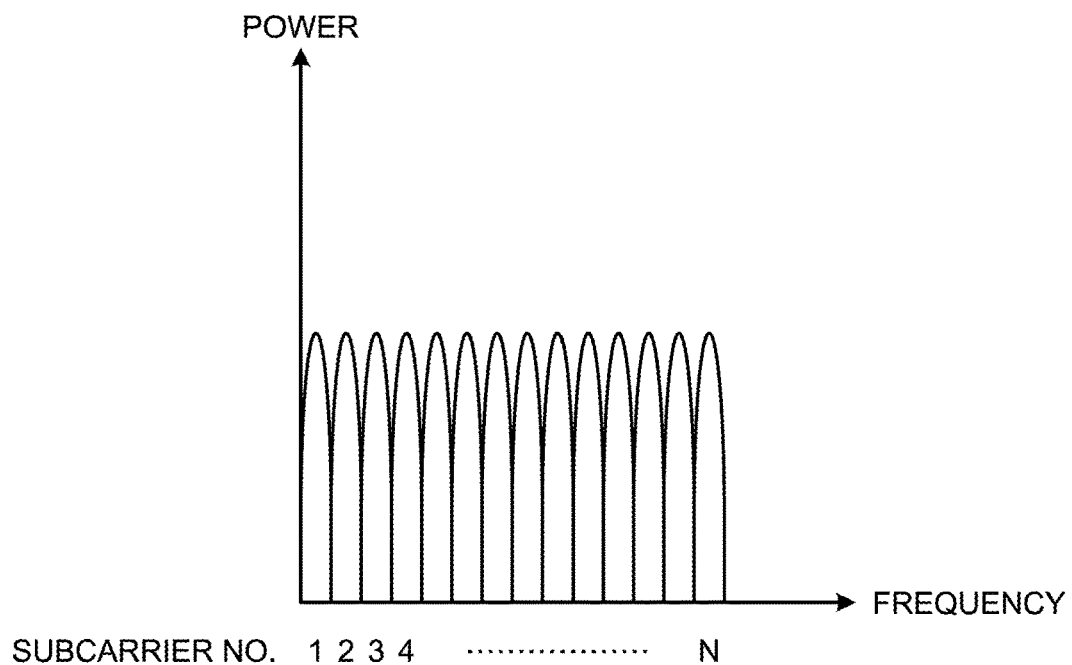
FIG. 3 is a schematic diagram conceptually describing DMT modulation.
Figure 4:
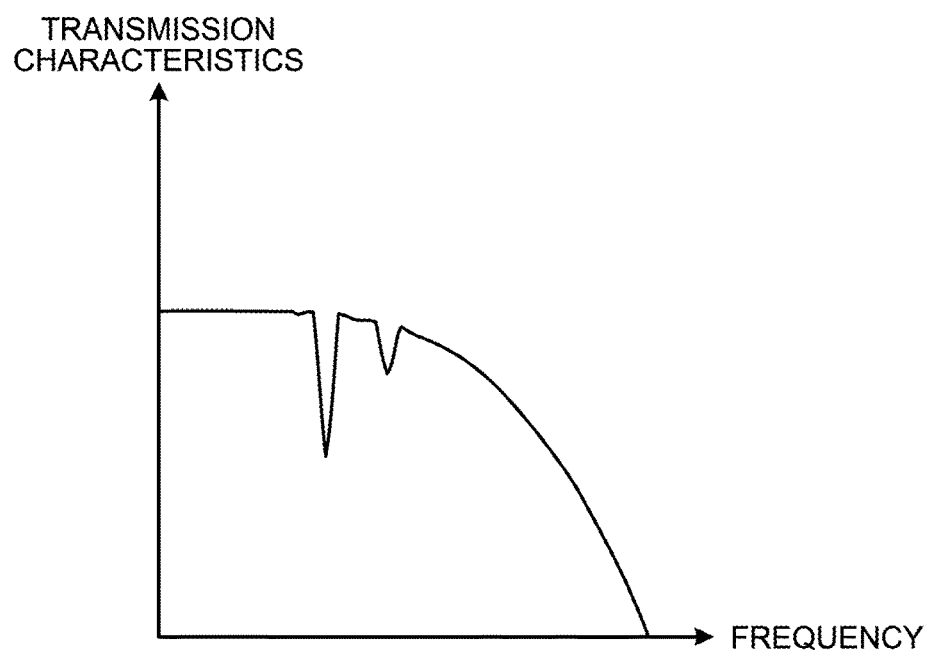
FIG. 4 is a schematic diagram conceptually describing DMT modulation.
Figure 5:
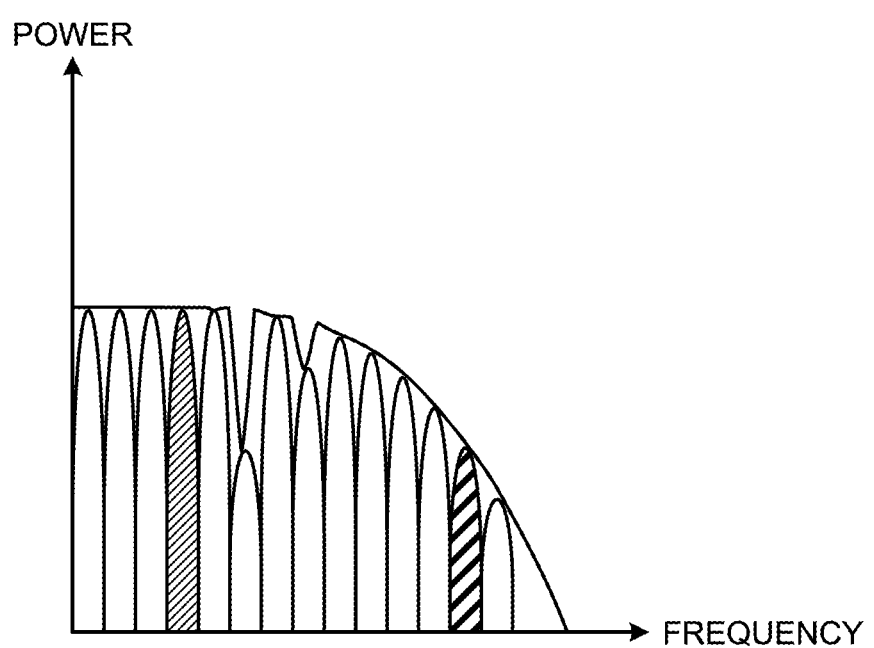
FIG. 5 is a schematic diagram conceptually describing DMT modulation.

FIGS. 3 to 5 are schematic diagrams conceptually describing DMT modulation. As illustrated in FIG. 3, N subcarriers are set in a frequency domain. For example, N is assumed to be 256. Subcarrier numbers are indicated by "1" to "N". In FIG. 3, a larger subcarrier number means a higher frequency. Incidentally, the order of allocation of subcarrier numbers to frequencies is of no importance.

According to the DMT modulation scheme, more bits may be allocated to one symbol for a subcarrier with high transmission characteristics than for a subcarrier with low transmission characteristics. The transmission characteristics here may be referred to also as "receiving characteristics" or "signal quality". For example, as illustrated in FIG. 4, a case is assumed where the transmission characteristics become higher or lower depending on the frequency. In this case, the constellation mapper 113 allocates more bits per symbol to a subcarrier with a subcarrier number with high transmission characteristics (for example, see diagonal lines in FIG. 5) than to a subcarrier with a subcarrier number with low transmission characteristics (for example, see thick diagonal lines in FIG. 5).

Additionally, the number of bits to be allocated may be considered to correspond to a multi-level degree in DMT modulation. For example, if DMT modulation is quadrature phase shift keying (QPSK), the multi-level degree is four. If DMT modulation is quadrature amplitude modulation (M-QAM), the multi-level degree is M (M=16, 64, 256, . . . ).

In FIG. 2, the IFFT 114 converts a signal in the frequency domain mapped to a symbol on a per-subcarrier basis by the constellation mapper 113 into a signal in a time domain by performing inverse fast Fourier transform (IFFT) processing. The IFFT 114 outputs the signal which has been converted into a signal in the time domain to the CP adder 115.

The CP adder 115 adds a CP to the signal (symbol data) which has been converted into the time domain by the IFFT 114. The CP adder 115 may add a CP by copying data of a predetermined length from the end of symbol data after the IFFT processing, and adding the copied data to the head of the symbol, for example. An inter-symbol interference may be removed or reduced by the addition of CP.

The P/S converter 116 P/S-converts the symbol data to which the CP has been added by the CP adder 115, and generates a DMT modulated signal. The P/S converter 116 outputs the generated DMT modulated signal to the DAC 12.

The DAC 12 converts the DMT modulation signal, which is a digital signal output from the P/S converter 116 of the DMT modulator 11, into an analog signal, and outputs the analog signal to the E/O module 13.

The E/O module 13 converts the DMT modulated signal, which is the analog signal output from the DAC 12, into an optical signal. For example, the E/O module 13 includes a light source and a driver. A block including the light source and the driver may be referred to also as a "transmitter optical sub-assembly (TOSA)". The driver provides a drive signal according to the DMT modulated signal, which is an analog signal, to the light source. Drive conditions (such as a bias current and amplitude) of the light source are controlled according to the drive signal. Light emission power of the light source is caused to vary with the control, and a DMT modulated optical signal is thereby generated.

That is, the E/O module 13 performs modulation on output light of the light source with the DMT modulated signal. The light source is a semiconductor laser, for example. In the case of direct modulation with the DMT modulated signal, the semiconductor laser may be referred to as a "direct modulation laser (DML)". The E/O module 13 transmits the generated DMT modulated optical signal to the optical transmission line 3.

Configuration of Optical Receiver

Figure 6:
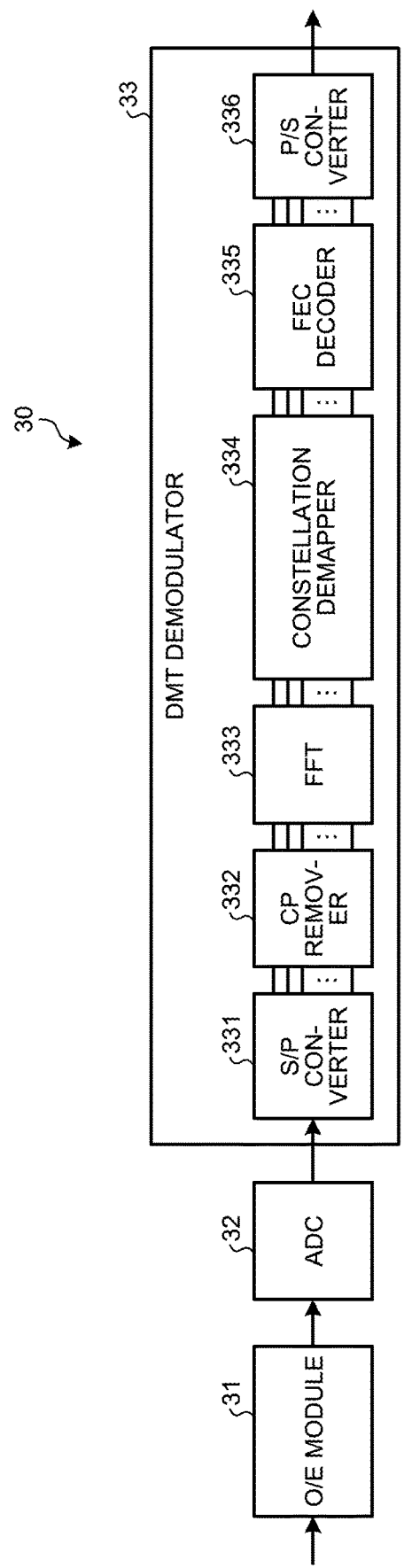
FIG. 6 is a block diagram illustrating an example configuration of an optical receiver of the optical transmission system according to the embodiment.

FIG. 6 is a block diagram illustrating an example configuration of the optical receiver 30 of the optical transmission system 1 according to the embodiment. The optical receiver 30 includes an optical-to-electrical conversion (O/E) module 31, an analog-to-digital converter (ADC) 32, and a DMT demodulator 33.

The O/E module 31 receives the DMT modulated optical signal from the optical transmission line 3. For example, the O/E module 31 includes a PD (photodetector or photodiode), which is an example of a light receiving element.

The PD converts the received DMT modulated optical signal into an electrical signal (such as a current signal) having an amplitude according to received optical signal power. The current signal from the PD according to the received optical signal power is converted into a voltage signal by a transimpedance amplifier (TIA), for example. A block including the PD and the TIA may be referred to as a "receiver optical sub-assembly (ROSA)".

The ADC 32 converts an electrical signal, which is an analog signal which has been photoelectrically converted by the O/E module 31, into a digital signal.

The DMT demodulator 33 DMT-demodulates the digital signal, which has been converted by the ADC 32, to obtain received data.

The DMT demodulator 33 includes an S/P converter 331, a CP remover 332, a fast Fourier transformer (FFT) 333, a constellation demapper 334, an FEC decoder 335, and a P/S converter 336.

The S/P converter 331 S/P-converts the electrical signal output from the ADC 32 into parallel signals of a number according to the number of subcarriers. The S/P converter 331 outputs the parallel signals obtained by the S/P conversion to the CP remover 332.

The CP remover 332 receives the parallel signals output from the S/P converter 331, and removes the CP from the parallel signals. The CP is the CP added to the DMT modulated signal by the CP adder 115 of the optical transmitter 10. The CP remover 332 outputs the parallel signals from which the CP has been removed (i.e., DMT modulated signal) to the FFT 333.

The FFT 333 converts the DMT modulated signal from which the CP has been removed into a signal in the frequency domain by performing fast Fourier transform (FFT) processing. The FFT 333 outputs the DMT modulated signal which has been subjected to the FFT processing to the constellation demapper 334.

The constellation demapper 334 identifies a received symbol in the "constellation" on a per-subcarrier basis from the signal in the frequency domain obtained by the FFT 333, and extracts (demaps) bits mapped to the received symbol. The DMT modulated signal is thereby demodulated. Such demapping may be referred to as "multi-carrier demodulation" or "subcarrier demodulation". Moreover, the signal for each subcarrier after demapping will be referred to as a "subcarrier signal". The constellation demapper 334 outputs the subcarrier signal to the FEC decoder 335.

The FEC decoder 335 is an example of an error correction decoder, and performs error correction decoding on a subcarrier signal after demapping by the constellation demapper 334. The scheme of error correction decoding may be any scheme corresponding to the error correction coding scheme applied to the FEC encoder 112 of the optical transmitter 10.

The P/S converter 336 P/S-converts the subcarrier signal which has been subjected to error correction decoding by the FEC decoder 335. Received data of a demodulated and decoded serial signal is thereby obtained.

Additionally, inverse fast Fourier transform is performed by the IFFT 114 of the DMT modulator 11, and fast Fourier transform is performed by the FFT 333 of the DMT demodulator 33, but this is not restrictive. The IFFT 114 of the DMT modulator 11 and the FFT 333 of the DMT demodulator 33 may be substituted by an inverse discrete Fourier transformer (IDFT) and a discrete Fourier transformer (DFT), respectively. That is, inverse discrete Fourier transform may be performed by an IDFT of the DMT modulator 11, and discrete Fourier transform may be performed by a DFT of the DMT demodulator 33.

Dip in Transmission Characteristics

Now, as illustrated in FIG. 4, a subcarrier with a significantly deteriorated optical signal-to-noise ratio (OSNR), i.e., transmission characteristics, is sometimes caused with respect to a DMT modulated optical signal received by the optical receiver 30.

Such a dip in the transmission characteristics is caused by an influence of power fading which is due to a parameter α of a frequency chirp added in a transmission optical signal depending on frequency characteristics of the light source of the optical transmitter 10, and to dispersion to which the DMT modulated signal is subjected in the optical transmission line 3, for example.

A relative intensity $I_R$ of the DMT modulated optical signal which is transmitted to the optical transmission line 3 may be represented by expression (1) below.

$$\frac{I_R}{m}(f) = \sqrt{1+\alpha^2} \left| \cos\left(\frac{\pi \lambda^2 DLf^2}{c} + \tan^{-1}(\alpha)\right) \right| \quad (1)$$

In the expression (1), "m" represents a degree of modulation, "α" represents a parameter of a frequency chirp of the optical transmitter 10, and "λ" represents a wavelength of the DMT modulated optical signal. Furthermore, "D" represents a wavelength dispersion value, "L" represents a length of the optical transmission line 3 (such as a transmission distance according to an optical fiber length), "f" represents a frequency, and "c" represents a light speed.

Figure 7:
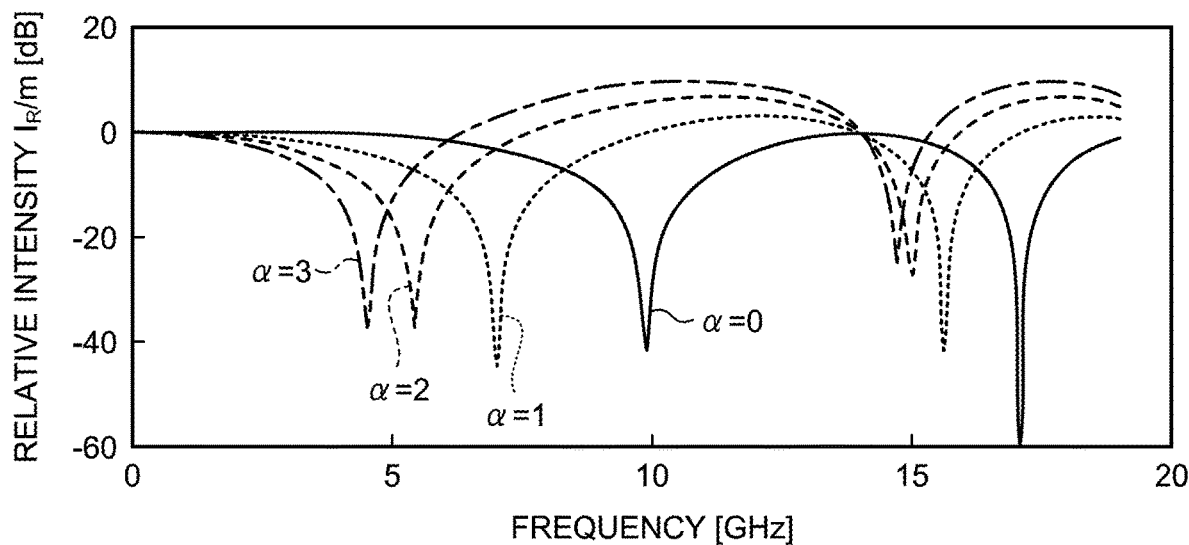
FIG. 7 is a diagram for describing power fading.

FIG. 7 is a diagram for describing power fading. FIG. 7 illustrates frequency response characteristics where the parameters α of different frequency chirps are given as 0, 1, 2, 3, where the wavelength dispersion value D is given as 16 [ps/nm/km], the transmission distance L is given as 40 [km], and the wavelength λ is given as 1550 [nm]. As illustrated in FIG. 7, the frequency response characteristics of the DMT modulated optical signal represent a relationship between a frequency f and the relative intensity $I_R$ of the DMT modulated optical signal, and are changed depending on the parameter α of the frequency chirp of the optical transmitter 10. That is, a frequency at which a dip in the transmission characteristics is caused changes depending on the parameter α of the frequency chirp.

Furthermore, when the wavelength dispersion value D, the wavelength λ, and the parameter α of the frequency chirp are invariable, and different transmission distances L are used, if the transmission distance L is changed, the frequency response characteristics of the DMT modulated optical signal are changed depending on the transmission distance L. That is, the frequency at which a dip in the transmission characteristics is caused changes also depending on the transmission distance of the DMT modulated optical signal.

In a DMT transmission band, the frequency response characteristics of the DMT modulated optical signal are ideally flat. However, depending on the frequency characteristics of optical devices used in the optical transmitter 10 and the optical receiver 30, the DMT modulated optical signal are easily subjected to band limitations at, for example, a higher frequency, tending to result in reduced transmission characteristics (see FIG. 4).

Furthermore, in the DMT transmission band, in addition to the band limitations as described above, a dip in the transmission characteristics is caused based on the parameter α of the frequency chirp of the optical transmitter 10 and dispersion to which the DMT modulated signal is subjected in the optical transmission line 3 (see FIGS. 4 and 7). In this case, a symbol of a subcarrier with a dip in the transmission characteristics is not available for allocation of transmission data bits. Even if allocation is possible, a smaller number of transmission data bits can be allocated than when there is no dip in the transmission characteristics (see FIG. 5).

LCC

The DMT modulation scheme considers use of one or more subcarriers for realization of functions instead of for data transmission. Such a function may be a link communication channel (LCC), for example. An LCC is used, at the time of activation of the system, for transmission of a control command (control signal) between the optical transmitter 10 of the optical transmission device 2A and the optical receiver 30 of the optical transmission device 2B so as to reliably realize data transmission between the optical transmission device 2A and the optical transmission device 2B.

The LCC is allocated, in the frequency domain, to one or more subcarriers among the N subcarriers. Data, such as transmission data, is allocated, in the frequency domain, to a subcarrier other than the subcarrier allocated with the LCC, among the N subcarriers.

Here, in the case where there is a subcarrier with a dip in the transmission characteristics, it is not desirable to allocate the LCC to such a subcarrier with a dip in the transmission characteristics. In the case where the LCC is allocated with a subcarrier with a dip in the transmission characteristics, the LCC is possibly not established. If the LCC is not established, activation of the system is prevented.

On the other hand, it is also not desirable to allocate the LCC to a subcarrier with very good transmission characteristics. A subcarrier which is allocated with the LCC is used to activate the system, and is not used for data transmission. That is, if the LCC is allocated to a subcarrier with very good transmission characteristics, transmission capacity is reduced or reception sensitivity is reduced, thereby affecting the transmission characteristics.

Furthermore, it is not desirable to set in advance, at the time of designing, shipping or the like, the subcarrier to be used for the LCC. As described above, with the frequency response characteristics of the DMT modulated optical signal, the frequency in which a dip in the transmission characteristics is caused depending on the parameter α of the frequency chirp or the transmission distance L is variable. Accordingly, the subcarrier to be used for the LCC is desirably set at the time of activation of the system.

Configuration of Controller

Figure 8:
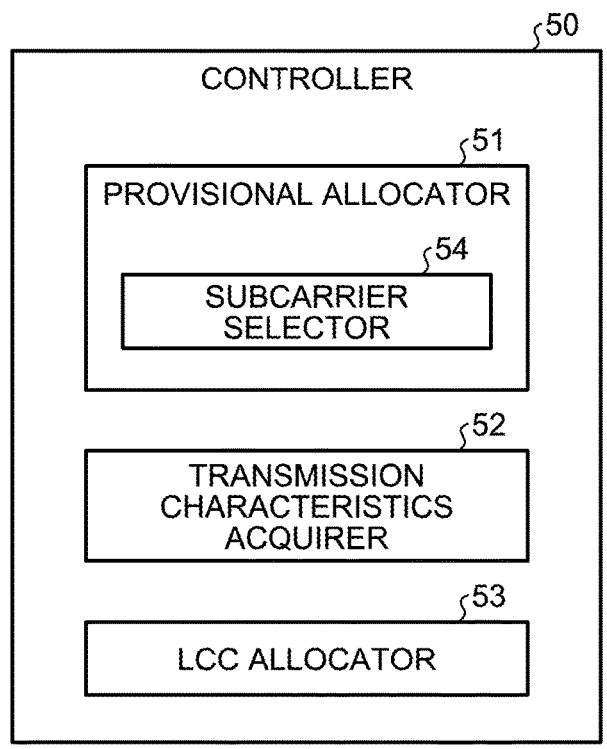
FIG. 8 is a block diagram illustrating an example configuration of a controller of the optical transmission system according to the embodiment.

FIG. 8 is a block diagram illustrating an example configuration of the controller 50 of the optical transmission system 1 according to the embodiment. As elements to be used at the time of activation of the system, the controller 50 includes a provisional allocator 51, a transmission characteristics acquirer 52, and an LCC allocator 53.

The provisional allocator 51 includes a subcarrier selector 54. The subcarrier selector 54 selects a subcarrier from the N subcarriers by any of the following methods (1) to (3). Then, the subcarrier selector 54 controls the optical transmitter 10 of own device, and transmits a control command (control signal) to another optical transmission device on each selected subcarrier. If the own device is the optical transmission device 2A, the other optical transmission device is the optical transmission device 2B. Moreover, a packet internet groper (Ping) may be cited as the control command, for example.

Then, the provisional allocator 51 provisionally allocates the LCC to a subcarrier, among the N subcarriers, where a response is received from the other optical transmission device (the optical transmission device 2B) for the control command (control signal).

The transmission characteristics acquirer 52 performs negotiation with the other optical transmission device (the optical transmission device 2B) using the subcarrier where a response is received, and acquires the transmission characteristics of the subcarrier where a response is received.

Among subcarriers, the transmission characteristics of which are acquired, the LCC allocator 53 allocates the LCC to a subcarrier where the acquired transmission characteristics are the bare minimum transmission characteristics.

Overall Operation

Figure 9:
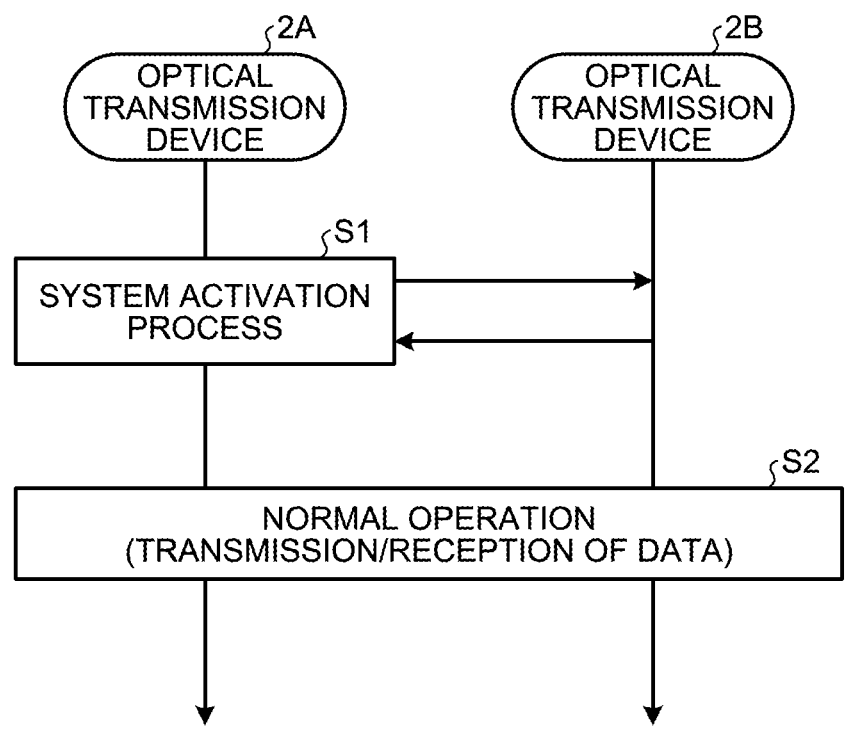
FIG. 9 is a sequence diagram illustrating an operation of the optical transmission system according to the embodiment.

FIG. 9 is a sequence diagram illustrating an operation of the optical transmission system 1 according to the embodiment. First, the optical transmission device 2A performs a system activation process (step S1). In the system activation process, the controller 50 of the optical transmission device 2A controls the optical transmitter 10 of the own device and transmits a control command, and the controller 50 of the optical transmission device 2B controls the optical receiver 30 of the own device and issues a response to the control command. The controller 50 of the optical transmission device 2A sets a subcarrier to be used for the LCC, based on the response from the optical transmission device 2B. Then, the optical transmission device 2A and the optical transmission device 2B perform normal operation (step S2). In the normal operation, the controllers 50 of the optical transmission device 2A and the optical transmission device 2B control the optical transmitter 10 and the optical receiver 30 of the own devices, and transmission/reception of data is performed between the optical transmission device 2A and the optical transmission device 2B.

System Activation Process

Figure 10:
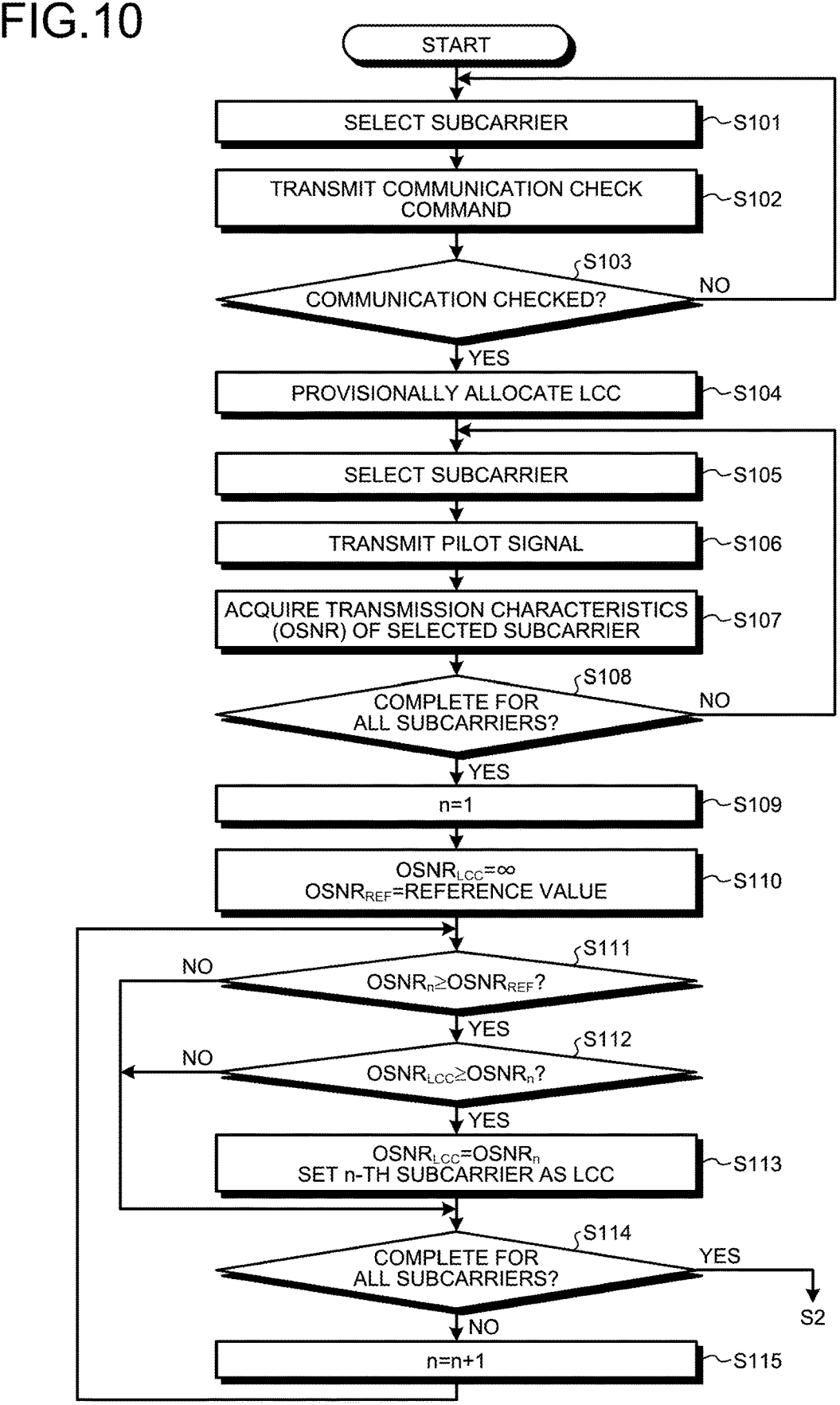
FIG. 10 is a flowchart illustrating a system activation process in FIG. 9.

FIG. 10 is a flowchart illustrating the system activation process in FIG. 9.

First, at the controller 50 of the optical transmission device 2A, the subcarrier selector 54 of the provisional allocator 51 selects, from the N subcarriers, a subcarrier to be used for transmission of a communication check command (step S101). Next, the subcarrier selector 54 controls the optical transmitter 10 of the own device, and transmits a communication check command, as the control command, to the optical transmission device 2B by using the selected subcarrier (step S102). Next, the subcarrier selector 54 controls the optical receiver 30 of the own device, and performs communication check regarding whether or not there is a response from the optical transmission device 2B for the communication check command (step S103).

Now, as the method for selecting a subcarrier for transmitting a communication check command in step S101, the following methods (1) to (3) are conceivable.

First, with the method (1) in step S101, the subcarrier selector 54 of the provisional allocator 51 selects all the subcarriers (in this case, N subcarriers). In this case, in step S102, the subcarrier selector 54 controls the optical transmitter 10 of the own device, and simultaneously transmits the communication check command to the optical transmission device 2B by using all the subcarriers. In step S103, the subcarrier selector 54 controls the optical receiver 30 of the own device, and performs communication check regarding whether or not there is a response from the optical transmission device 2B for the control command.

With the method (2) in step S101, the subcarrier selector 54 of the provisional allocator 51 selects n subcarriers from the N subcarriers (where n is an integer satisfying n<N) in a sequential manner. As the selection method, sequential selection of n subcarriers from the low frequency side, sequential selection of n subcarriers from the high frequency side, and sequential selection of n subcarriers in a random manner are conceivable, for example. In this case, in step S102, the subcarrier selector 54 controls the optical transmitter 10 of the own device, and transmits the communication check command to the optical transmission device 2B on every n subcarriers. In step S103, the subcarrier selector 54 controls the optical receiver 30 of the own device, and performs communication check regarding whether or not there is a response from the optical transmission device 2B for the control command. Steps S101 to S103 are performed until the communication check has been performed for all the subcarriers (in this case, N subcarriers) (step S103: Yes).

Figure 11:
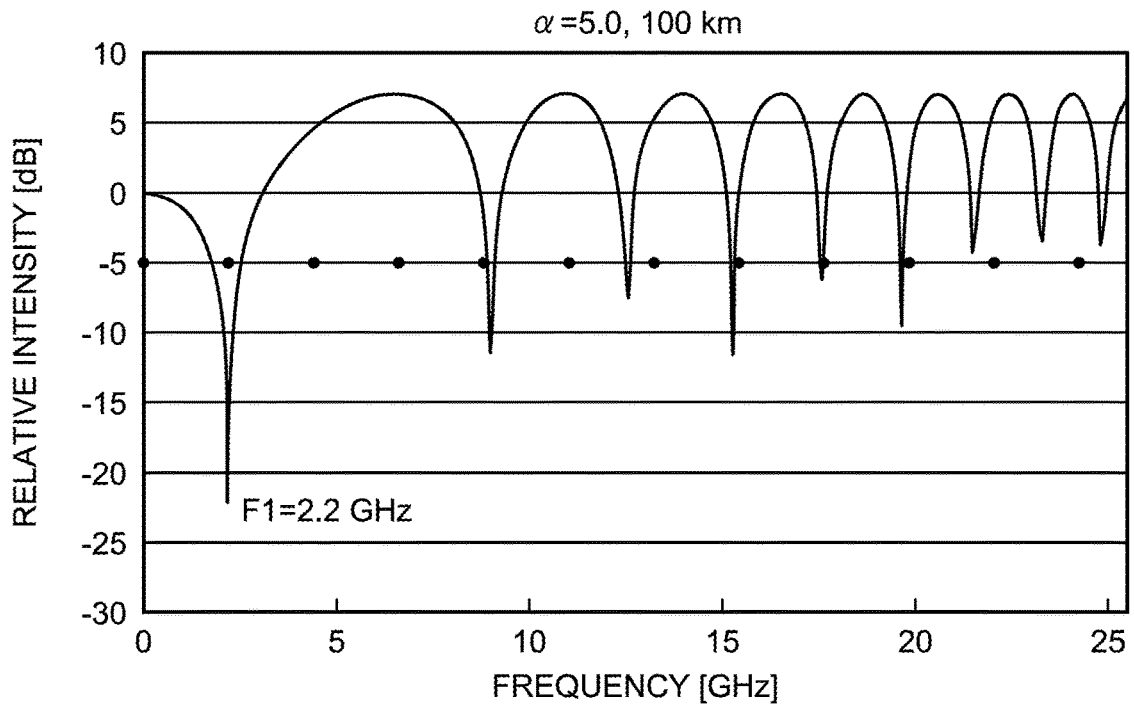
FIG. 11 is a diagram illustrating an example of frequency response characteristics, for describing a process in step S101 in FIG. 10.
Figure 12:
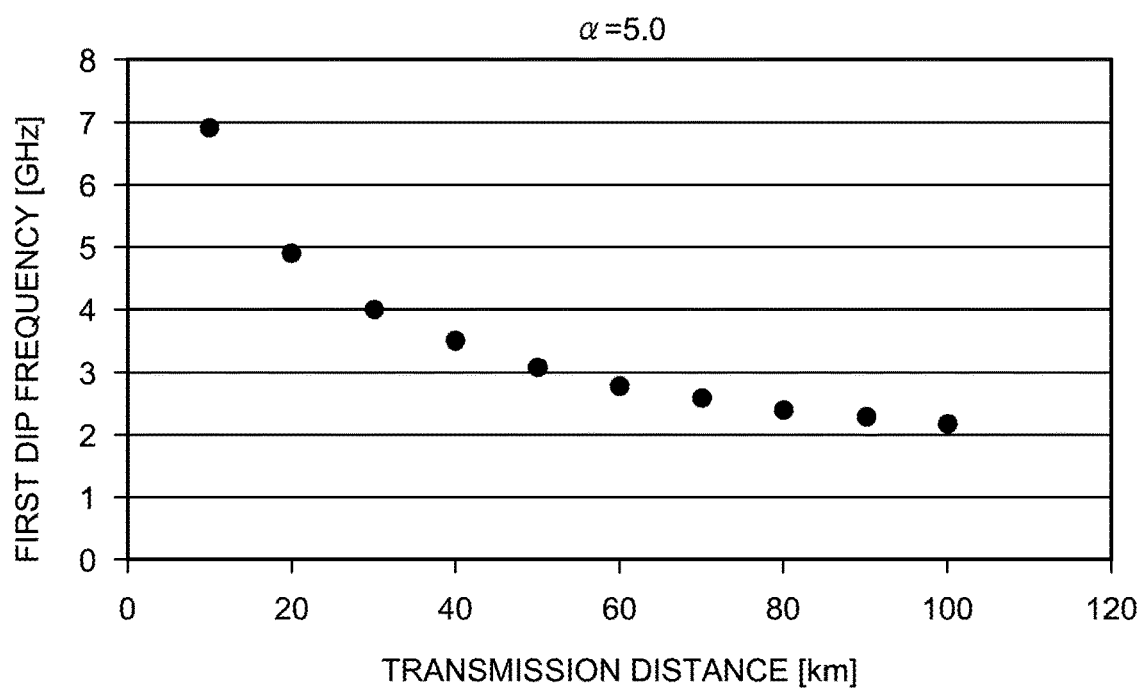
FIG. 12 is a diagram illustrating an example of a first dip frequency, for describing the process in step S101 in FIG. 10.
Figure 13:
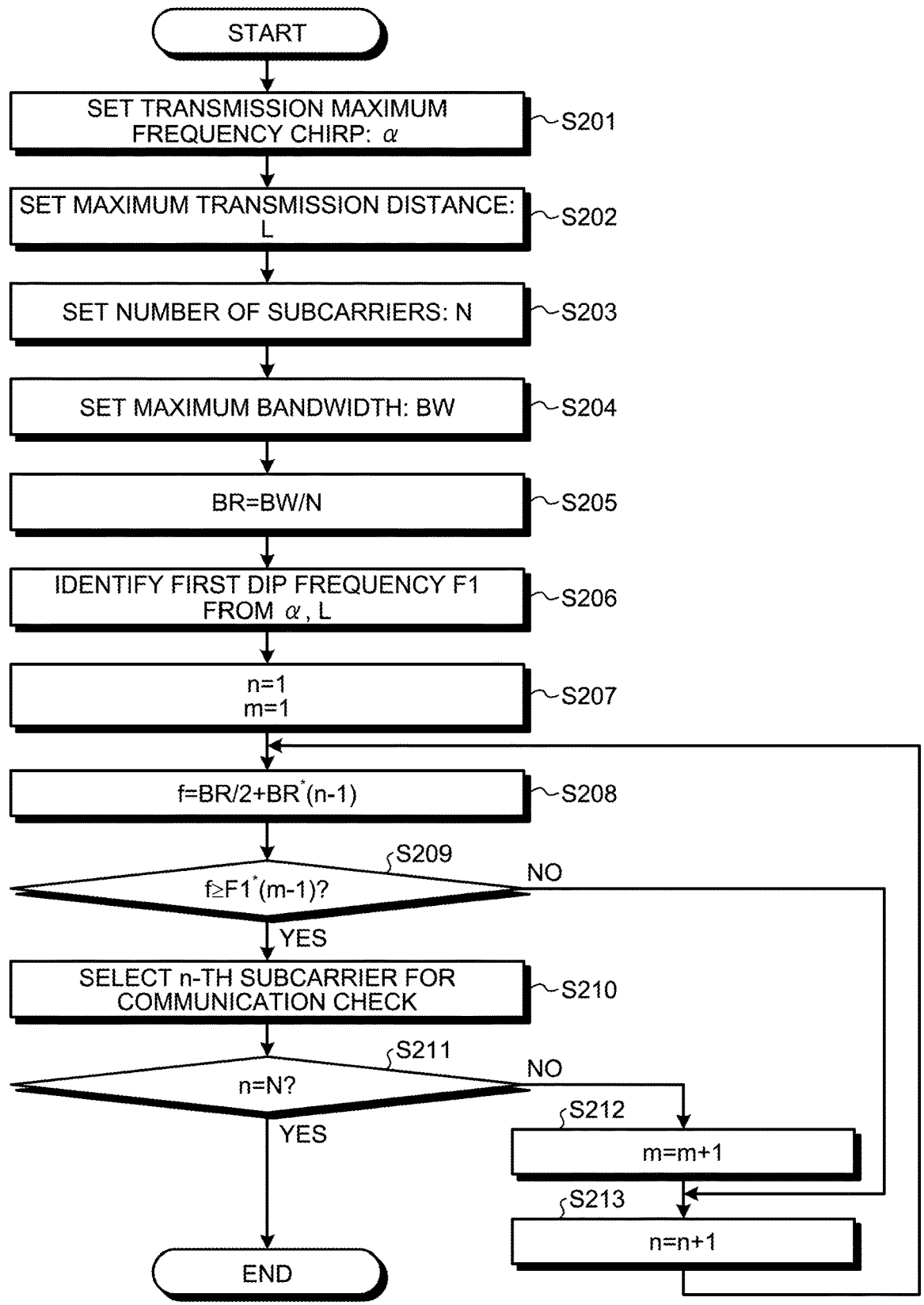
FIG. 13 is a flowchart illustrating an example of the process in step S101 in FIG. 10.

With the method (3) in step S101, the subcarrier selector 54 of the provisional allocator 51 sequentially selects a subcarrier from the N subcarriers by a selection method illustrated in FIGS. 11 to 13.

FIG. 11 is a diagram illustrating an example of frequency response characteristics, for describing the process in step S101 in FIG. 10. FIG. 12 is a diagram illustrating an example of a first dip frequency, for describing the process in step S101 in FIG. 10. A dip frequency here indicates a frequency at which a dip is caused in the relative intensity $I_R$.

As illustrated in FIG. 11, power fading repeatedly occurs with the cycle being reduced toward higher frequencies. A first dip frequency F1 (frequency corresponding to a first trough in FIG. 11) is the lowest frequency when values of the wavelength dispersion value D and the parameter α of the frequency chirp of the optical transmitter 10 are the greatest under conceivable use conditions.

A frequency chirp of a modulator that is used (for example, the DMT modulator 11 of the optical transmitter 10) is about 3.5 even in the case of a direct modulation laser with a large frequency chirp, and if the parameter α of the frequency chirp is given as 5.0, it can be said that a sufficiently large frequency chirp is assumed. Furthermore, if the transmission distance L of a system which does not use optical dispersion compensation is given as 100 [km], a sufficient wavelength dispersion value D can be assumed. Accordingly, as illustrated in FIGS. 11, 12, it can be seen that the first dip frequency F1 is approximately 2.2 [GHz].

In this case, in step S101, the subcarrier selector 54 of the provisional allocator 51 calculates frequency response characteristics representing a relationship between the frequency f and the relative intensity $I_R$ of the DMT modulated optical signal by the expression (1) described above. That is, the subcarrier selector 54 calculates the frequency response characteristics by an arithmetic equation using the degree m of modulation, the parameter α of the frequency chirp of the optical transmitter 10, the wavelength λ of the DMT modulated optical signal, the wavelength dispersion value D, the transmission distance L, the frequency f, and the light speed c. At this time, the subcarrier selector 54 identifies (determines) the frequency at which a dip in the relative intensity $I_R$ first occurs in the frequency response characteristics, or in other words, the first dip frequency F1. Then, the subcarrier selector 54 selects, from the N subcarriers, n subcarriers (where n is an integer satisfying n<N) in a sequential manner at an interval corresponding to the first dip frequency F1. In step S102, the subcarrier selector 54 controls the optical transmitter 10 of the own device, and transmits the communication check command to the optical transmission device 2B every n subcarriers. In step S103, the subcarrier selector 54 controls the optical receiver 30 of the own device, and performs communication check regarding whether or not there is a response from the optical transmission device 2B for the control command. Steps S101 to S103 are performed until the communication check has been performed for all the subcarriers (in this case, N subcarriers) (step S103: Yes).

By transmitting the communication check command every n subcarriers at an interval corresponding to the first dip frequency F1, the subcarrier selector 54 of the provisional allocator 51 is capable of establishing the LCC while reliably avoiding an influence of power fading. Dots in FIG. 11 indicate intervals (cycles) corresponding to 2.2 [GHz], which is the first dip frequency F1. It can be seen from FIG. 11 that the influence of power fading is avoided by some subcarriers. For example, in the case of a transmission system which uses 256 subcarriers at a 100 [MHz] interval, the subcarrier selector 54 transmits the communication check command every 22 subcarriers.

FIG. 13 is a flowchart illustrating an example of the process in step S101 in FIG. 10.

The subcarrier selector 54 of the provisional allocator 51 sets the parameter α of the maximum frequency chirp of the optical transmitter 10 (step S201), and sets the transmission distance L at the maximum transmission distance (step S202). Furthermore, the subcarrier selector 54 sets the number N of subcarriers (step S203), and sets a maximum bandwidth BW (step S204). Then, the subcarrier selector 54 calculates a baud rate (BR) by BW/N (step S205).

Next, the subcarrier selector 54 calculates the frequency response characteristics by the arithmetic equation (the expression (1)) using the degree m of modulation, the parameter α of the frequency chirp of the optical transmitter 10, the wavelength λ of the DMT modulated optical signal, the wavelength dispersion value D, the transmission distance L, the frequency f, and the light speed c. At this time, the subcarrier selector 54 identifies the frequency at which a dip in the relative intensity $I_R$ first occurs in the frequency response characteristics, or in other words, the first dip frequency F1 (step S206).

Next, the subcarrier selector 54 selects, from the N subcarriers, n subcarriers (n<N) in a sequential manner at an interval corresponding to the first dip frequency F1, by the processes in steps S207 to S213 described below.

First, the subcarrier selector 54 sets constants n, m to one (step S207). Then, the subcarrier selector 54 calculates the frequency f by BR/2+BR×(n−1) (step S208). The subcarrier selector 54 determines whether or not the frequency f is at or higher than (f1×(m−1)) (step S209).

If the result of the determination indicates that the frequency f is not at or higher than (f1×(m−1)) (step S209: No), the subcarrier selector 54 of the provisional allocator 51 adds one to the constant n (step S213). Then, the subcarrier selector 54 performs steps from step S208.

On the other hand, if the result of the determination indicates that the frequency f is at or higher than (f1×(m−1)) (step S209: Yes), the subcarrier selector 54 of the provisional allocator 51 selects an n-th subcarrier as the subcarrier for communication check (step S210). The subcarrier selector 54 determines whether or not the constant n is the number N of subcarriers (step S211).

If the result of the determination indicates that the constant n is not equal to the number N of subcarriers (step S211: No), the subcarrier selector 54 of the provisional allocator 51 adds one to the constant m (step S212). Then, the subcarrier selector 54 performs step S213, and performs steps from step S208.

On the other hand, if the result of the determination indicates that the constant n is equal to the number N of subcarriers (step S211: Yes), the subcarrier selector 54 of the provisional allocator 51 performs the processes in steps S102, S103.

It is assumed here that communication check has been performed for all the subcarriers (in this case, the N subcarriers) (step S103: Yes). At this time, it is assumed that a response for the communication check command is received for M subcarriers (where M is an integer satisfying M<N) among the N subcarriers. In this case, as illustrated in FIG. 10, the provisional allocator 51 provisionally allocates the LCC to the M subcarriers where a response is received (step S104).

Next, at the controller 50 of the optical transmission device 2A, the transmission characteristics acquirer 52 sequentially selects a subcarrier from the M subcarriers (step S105). The order of selection of the subcarriers is of no importance, but in the present embodiment, subcarriers are assumed to be selected in order from the first to the M-th.

Next, the transmission characteristics acquirer 52 controls the optical transmitter 10 of the own device, transmits a pilot signal to the optical transmission device 2B by using the selected subcarrier, and performs negotiation between the optical transmission device 2A and the optical transmission device 2B (step S106). At this time, the transmission characteristics acquirer 52 acquires the transmission characteristics of the selected subcarrier based on the result of the negotiation (step S107). Example indices of the transmission characteristics include optical signal-to-noise ratio (OSNR) and a bit error rate (BER), and in the present embodiment, the OSNR is cited as the example of the transmission characteristics. Steps S105 to S108 are performed until acquisition of the OSNR is complete for all the subcarriers (in this case, the M subcarriers) (step S108: Yes).

It is assumed here that the OSNR is acquired for all the subcarriers (in this case, the M subcarriers) (step S108: Yes).

Next, at the controller 50 of the optical transmission device 2A, the LCC allocator 53 sets the constant n to one (step S109). Then, the LCC allocator 53 sets an $OSNR_{LCC}$, as a candidate for the OSNR of a subcarrier that can be used as the LCC, and an $OSNR_{REF}$, as a reference value for the OSNR of a subcarrier that can be used as the LCC (step S110). At first, the $OSNR_{LCC}$ is set to ∞.

Next, the LCC allocator 53 determines whether or not an $OSNR_n$ of an n-th subcarrier, among OSNRs of the M subcarriers, is at or above the $OSNR_{REF}$ (step S111).

If the result of the determination indicates that the $OSNR_n$ is not at or above the $OSNR_{REF}$ (step S111: No), the LCC allocator 53 performs step S114 described later.

On the other hand, if the result of the determination indicates that the $OSNR_n$ is at or above the $OSNR_{REF}$ (step S111: Yes), the LCC allocator 53 determines whether or not the $OSNR_{LCC}$ is at or above the $OSNR_n$ (step S112).

If the result of the determination indicates that the $OSNR_{LCC}$ is not at or above the $OSNR_n$ (step S112: No), the LCC allocator 53 performs step S114 described later.

On the other hand, if the result of the determination indicates that the $OSNR_{LCC}$ is at or above the $OSNR_n$ (step S112: Yes), the LCC allocator 53 takes the $OSNR_{LCC}$ as the $OSNR_n$, and sets the LCC at the n-th subcarrier (step S113).

Next, the LCC allocator 53 determines whether or not the constant n is equal to the number M of subcarriers where the response is received. That is, the LCC allocator 53 determines whether or not steps S111 to S113 described above have been performed for all the subcarriers (in this case, the M subcarriers) (step S114).

If the result of the determination indicates that steps S111 to S113 described above are not yet performed for all the subcarriers (the M subcarriers) (step S114: No), the LCC allocator 53 adds one to the constant n (step S115). Then, the LCC allocator 53 performs steps from step S111.

On the other hand, it is assumed that the result of the determination indicates that steps S111 to S113 described above have been performed for all the subcarriers (the M subcarriers) (step S114: Yes). In this case, the LCC allocator 53 allocates the LCC to the subcarrier for which a bare minimum OSNR is obtained by steps S109 to S115 described above. The controller 50 of the optical transmission device 2A then performs step S2 described above. That is, in the normal operation (step S2), the controllers 50 of the optical transmission device 2A and the optical transmission device 2B control the optical transmitter 10 and the optical receiver 30 of the own devices, and transmission/reception of data is performed between the optical transmission device 2A and the optical transmission device 2B.

Specific Example of LCC Allocation

Figure 14:
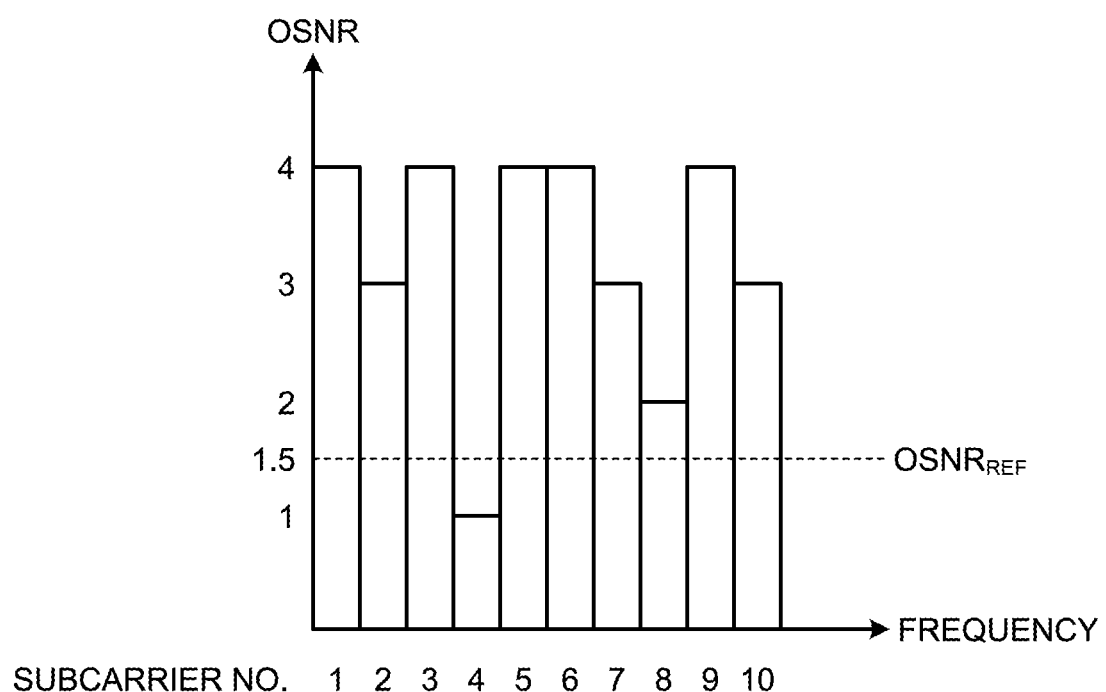
FIG. 14 is a schematic diagram conceptually describing allocation of an LCC by processes in steps S109 to S115 in FIG. 10.

FIG. 14 is a schematic diagram conceptually describing allocation of the LCC by processes in steps S109 to S115 in FIG. 10.

As illustrated in FIG. 14, for the sake of convenience, the number M of subcarriers where a response is received is assumed to be ten. In the following, with respect to the ten subcarriers, subcarriers whose subcarrier numbers are 1 to 10, respectively, will be referred to as first to tenth subcarriers. Here, as illustrated in FIG. 14, for the sake of convenience, the OSNRs of the first to the tenth subcarriers are assumed to be 4, 3, 4, 1, 4, 4, 3, 2, 4, 3.

In step S109, the LCC allocator 53 sets the constant n to one. In step S110, the $OSNR_{LCC}$, as a candidate for the OSNR of a subcarrier that can be used as the LCC, is set to ∞, as described above. Here, for the sake of convenience, the $OSNR_{REF}$, as a reference value for the OSNR of a subcarrier that can be used as the LCC, is set to 1.5.

A description will be given of a first round (i.e., n=1). The LCC allocator 53 determines whether or not an $OSNR_1$ of the first subcarrier, among the OSNRs of the ten subcarriers, is at or above the $OSNR_{REF}$ (step S111). The result of the determination indicates that the $OSNR_1$ is at or above the $OSNR_{REF}$ (step S111: Yes), and thus, the LCC allocator 53 determines whether or not the $OSNR_{LCC}$ is at or above the $OSNR_1$ (step S112). The result of the determination indicates that the $OSNR_{LCC}$ is at or above the $OSNR_1$ (step S112: Yes), and thus, the LCC allocator 53 takes the $OSNR_1$ as the $OSNR_{LCC}$, and sets the LCC at the first subcarrier (step S113). Then, because steps S111 to S113 described above are not yet performed for the ten subcarriers (step S114: No), the LCC allocator 53 adds one to the constant n (step S115). At this stage, the LCC is set at the first subcarrier, as described above.

Next, a description will be given of a second round (i.e., n=2). The LCC allocator 53 determines whether or not an $OSNR_2$ of the second subcarrier, among the OSNRs of the ten subcarriers, is at or above the $OSNR_{REF}$ (step S111). The result of the determination indicates that the $OSNR_2$ is at or above the $OSNR_{REF}$ (step S111: Yes), and thus, the LCC allocator 53 determines whether or not the $OSNR_{LCC}$ (in this case, $OSNR_1$) is at or above the $OSNR_2$ (step S112). The result of the determination indicates that the $OSNR_{LCC}$ ($OSNR_1$) is at or above the $OSNR_2$ (step S112: Yes), and thus, the LCC allocator 53 takes the $OSNR_2$ as the $OSNR_{LCC}$, and sets the LCC at the second subcarrier (step S113). Then, because steps S111 to S113 described above are not yet performed for the ten subcarriers (step S114: No), the LCC allocator 53 adds one to the constant n (step S115). At this stage, the LCC is set at the second subcarrier instead of the first subcarrier.

Next, a description will be given of a third round (i.e., n=3). The LCC allocator 53 determines whether or not an $OSNR_3$ of the third subcarrier, among the OSNRs of the ten subcarriers, is at or above the $OSNR_{REF}$ (step S111). The result of the determination indicates that the $OSNR_3$ is at or above the $OSNR_{REF}$ (step S111: Yes), and thus, the LCC allocator 53 determines whether or not the $OSNR_{LCC}$ (in this case, $OSNR_2$) is at or above the $OSNR_3$ (step S112). The result of the determination indicates that the $OSNR_{LCC}$ ($OSNR_2$) is not at or above the $OSNR_3$ (step S112: No). In this case, the LCC allocator 53 skips step S113. Then, because steps S111 to S113 described above are not yet performed for the ten subcarriers (step S114: No), the LCC allocator 53 adds one to the constant n (step S115). At this stage, the LCC is still set at the second subcarrier.

Next, a description will be given of a fourth round (i.e., n=4). The LCC allocator 53 determines whether or not an $OSNR_4$ of the fourth subcarrier, among the OSNRs of the ten subcarriers, is at or above the $OSNR_{REF}$ (step S111). According to the result of the determination, the $OSNR_3$ is below the $OSNR_{REF}$ (step S111: No), and thus, steps S112, S113 are skipped. Then, because steps S111 to S113 described above are not yet performed for the ten subcarriers (step S114: No), the LCC allocator 53 adds one to the constant n (step S115). At this stage, the LCC is still set at the second subcarrier.

Next, a description will be given of a fifth round (i.e., n=5). The LCC allocator 53 determines whether or not an $OSNR_5$ of the fifth subcarrier, among the OSNRs of the ten subcarriers, is at or above the $OSNR_{REF}$ (step S111). The result of the determination indicates that the $OSNR_5$ is at or above the $OSNR_{REF}$ (step S111: Yes), and thus, the LCC allocator 53 determines whether or not the $OSNR_{LCC}$ (in this case, $OSNR_2$) is at or above the $OSNR_5$ (step S112). The result of the determination indicates that the $OSNR_{LCC}$ ($OSNR_2$) is not at or above the $OSNR_5$ (step S112: No). In this case, the LCC allocator 53 skips step S113. Then, because steps S111 to S113 described above are not yet performed for the ten subcarriers (step S114: No), the LCC allocator 53 adds one to the constant n (step S115). At this stage, the LCC is still set at the second subcarrier.

Next, a description will be given of a sixth round (i.e., n=6). The LCC allocator 53 determines whether or not an $OSNR_6$ of the sixth subcarrier, among the OSNRs of the ten subcarriers, is at or above the $OSNR_{REF}$ (step S111). The result of the determination indicates that the $OSNR_6$ is at or above the $OSNR_{REF}$ (step S111: Yes), and thus, the LCC allocator 53 determines whether or not the $OSNR_{LCC}$ (in this case, $OSNR_2$) is at or above the $OSNR_6$ (step S112). The result of the determination indicates that the $OSNR_{LCC}$ ($OSNR_2$) is not at or above the $OSNR_6$ (step S112: No). In this case, the LCC allocator 53 skips step S113. Then, because steps S111 to S113 described above are not yet performed for the ten subcarriers (step S114: No), the LCC allocator 53 adds one to the constant n (step S115). At this stage, the LCC is still set at the second subcarrier.

Next, a description will be given of a seventh round (i.e., n=7). The LCC allocator 53 determines whether or not an $OSNR_7$ of the seventh subcarrier, among the OSNRs of the ten subcarriers, is at or above the $OSNR_{REF}$ (step S111). The result of the determination indicates that the $OSNR_7$ is at or above the $OSNR_{REF}$ (step S111: Yes), and thus, the LCC allocator 53 determines whether or not the $OSNR_{LCC}$ (in this case, $OSNR_2$) is at or above the $OSNR_7$ (step S112). The result of the determination indicates that the $OSNR_{LCC}$ ($OSNR_2$) is equal to the $OSNR_7$ (step S112: Yes), and thus, the LCC allocator 53 takes the $OSNR_7$ as the $OSNR_{LCC}$, and sets the LCC at the seventh subcarrier (step S113). Then, because steps S111 to S113 described above are not yet performed for the ten subcarriers (step S114: No), the LCC allocator 53 adds one to the constant n (step S115). At this stage, the LCC is set at the seventh subcarrier instead of the second subcarrier.

Next, a description will be given of an eighth round (i.e., n=8). The LCC allocator 53 determines whether or not an $OSNR_8$ of the eighth subcarrier, among the OSNRs of the ten subcarriers, is at or above the $OSNR_{REF}$ (step S111). The result of the determination indicates that the $OSNR_8$ is at or above the $OSNR_{REF}$ (step S111: Yes), and thus, the LCC allocator 53 determines whether or not the $OSNR_{LCC}$ (in this case, $OSNR_7$) is at or above the $OSNR_8$ (step S112). The result of the determination indicates that the $OSNR_{LCC}$ ($OSNR_7$) is at or above the $OSNR_8$ (step S112: Yes), and thus, the LCC allocator 53 takes the $OSNR_8$ as the $OSNR_{LCC}$, and sets the LCC at the eighth subcarrier (step S113). Then, because steps S111 to S113 described above are not yet performed for the ten subcarriers (step S114: No), the LCC allocator 53 adds one to the constant n (step S115). At this stage, the LCC is set at the eighth subcarrier instead of the seventh subcarrier.

Next, a description will be given of a ninth round (i.e., n=9). The LCC allocator 53 determines whether or not an $OSNR_9$ of the ninth subcarrier, among the OSNRs of the ten subcarriers, is at or above the $OSNR_{REF}$ (step S111). The result of the determination indicates that the $OSNR_9$ is at or above the $OSNR_{REF}$ (step S111: Yes), and thus, the LCC allocator 53 determines whether or not the $OSNR_{LCC}$ (in this case, $OSNR_8$) is at or above the $OSNR_9$ (step S112). The result of the determination indicates that the $OSNR_{LCC}$ ($OSNR_8$) is not at or above the $OSNR_9$ (step S112: No). In this case, the LCC allocator 53 skips step S113. Then, because steps S111 to S113 described above are not yet performed for the ten subcarriers (step S114: No), the LCC allocator 53 adds one to the constant n (step S115). At this stage, the LCC is still set at the eighth subcarrier.

Next, a description will be given of a tenth round (i.e., n=10). The LCC allocator 53 determines whether or not an $OSNR_{10}$ of the tenth subcarrier, among the OSNRs of the ten subcarriers, is at or above the $OSNR_{REF}$ (step S111). The result of the determination indicates that the $OSNR_{10}$ is at or above the $OSNR_{REF}$ (step S111: Yes), and thus, the LCC allocator 53 determines whether or not the $OSNR_{LCC}$ (in this case, $OSNR_8$) is at or above the $OSNR_{10}$ (step S112). The result of the determination indicates that the $OSNR_{LCC}$ ($OSNR_8$) is not at or above the $OSNR_{10}$ (step S112: No). In this case, the LCC allocator 53 skips step S113. Steps S111 to S113 described above are performed by the LCC allocator 53 for the ten subcarriers (step S114: Yes). In this case, the LCC allocator 53 allocates the LCC to the eighth subcarrier for which the bare minimum $OSNR_{LCC}$ ($OSNR_8$) is obtained by steps S109 to S115 described above.

Then, in the normal operation (step S2), the controllers 50 of the optical transmission device 2A and the optical transmission device 2B control the optical transmitter 10 and the optical receiver 30 of the own devices, and transmission/reception of data is performed between the optical transmission device 2A and the optical transmission device 2B.

Effects of Embodiment

As described above, the optical transmission system 1 according to the embodiment includes first and second optical transmission devices (the optical transmission devices 2A, 2B). The optical transmission device 2A, 2B includes the optical transmitter 10, and the controller 50. At the optical transmission device 2A, the optical transmitter 10 transmits, at the time of system activation, a control signal (communication check command) to the optical transmission device 2B by using a plurality of subcarriers. The controller 50 allocates the LCC to a subcarrier, among the plurality of subcarriers, for which the bare minimum transmission characteristics ($OSNR_{LCC}$) are obtained, based on responses from the optical transmission device 2B for the control signal (communication check command).

Furthermore, at the optical transmission device 2A of the optical transmission system 1 according to the embodiment, the controller 50 includes the transmission characteristics acquirer 52, and the LCC allocator 53. The transmission characteristics acquirer 52 performs negotiation with the optical transmission device 2B by using s subcarrier, among the plurality of subcarriers, where a response is received from the optical transmission device 2B for the control signal (communication check command). As a result of the negotiation, the transmission characteristics acquirer 52 acquires the transmission characteristics ($OSNR_n$) of the subcarrier where the response is received. The LCC allocator 53 allocates the LCC to a subcarrier, among subcarriers where the response is received, for which the bare minimum transmission characteristics ($OSNR_{LCC}$) are obtained. Specifically, the LCC allocator 53 determines whether or not the transmission characteristics ($OSNR_n$) of a subcarrier where the response is received are at or above the reference value ($OSNR_{REF}$). Then, the LCC allocator 53 allocates the LCC to a subcarrier with the lowest transmission characteristics ($OSNR_n$), among subcarriers with the transmission characteristics ($OSNR_n$) at or above the reference value ($OSNR_{REF}$).

As described above, with the optical transmission system 1 according to the embodiment, the optical transmission device 2A allocates the LCC to a subcarrier, among a plurality of subcarriers, for which the bare minimum transmission characteristics ($OSNR_{LCC}$) are obtained, based on responses from the optical transmission device 2B for the control signal. Here, if the LCC is allocated to a subcarrier where a dip is caused in the transmission characteristics, the OSNR may be significantly reduced, and the LCC is possibly not established. If the LCC is not established, activation of the system is prevented. Furthermore, if the LCC is allocated to a subcarrier with very good transmission characteristics, transmission capacity is reduced or reception sensitivity is reduced, thereby affecting the transmission characteristics. With the optical transmission system 1 according to the embodiment, the optical transmission device 2A allocates the LCC to a subcarrier, among a plurality of subcarriers, for which the bare minimum transmission characteristics ($OSNR_{LCC}$) are obtained, and thus, the system may be reliably activated, and the transmission characteristics may be improved.

Furthermore, at the optical transmission device 2A of the optical transmission system 1 according to the embodiment, the controller 50 includes a frequency response characteristics calculator, a dip frequency identifier, and the subcarrier selector 54. The frequency response characteristics calculator and the dip frequency identifier correspond to the subcarrier selector 54. The frequency response characteristics calculator calculates the frequency response characteristics representing a relationship between the frequency f and the relative intensity $I_R$ of the DMT modulated optical signal by the expression (1) described above. That is, the frequency response characteristics calculator calculates the frequency response characteristics by the arithmetic equation using the degree m of modulation, the parameter α of the frequency chirp of the optical transmitter 10, the wavelength λ of the DMT modulated optical signal, the wavelength dispersion value D, the transmission distance L, the frequency f, and the light speed c. At this time, the dip frequency identifier identifies the first dip frequency F1, which is the frequency at which a dip in the relative intensity $I_R$ first occurs in the frequency response characteristics. The subcarrier selector 54 selects, from a plurality of subcarriers, subcarriers in a sequential manner at an interval corresponding to the first dip frequency F1. The optical transmitter 10 transmits the control signal (communication check command) for each subcarrier selected by the subcarrier selector 54.

As described above, with the optical transmission system 1 according to the embodiment, the optical transmission device 2A selects, from a plurality of subcarriers, subcarriers at an interval corresponding to the first dip frequency F1, and transmits the control signal (communication check command) for each selected subcarrier. Therefore, with the optical transmission system 1 according to the embodiment, the optical transmission device 2A may establish the LCC while reliably avoiding an influence of power fading.

Other Embodiments

The components of the units illustrated in the embodiment do not have to be physically configured in the manner illustrated in the drawings. In other words, specific forms of distribution and integration of the components are not limited to those illustrated in the drawings, and all or part of the components may be functionally or physically distributed or integrated in arbitrary units depending on various loads or use conditions.

Furthermore, all or any of processing performed by each device may be performed on a central processing unit (CPU) (or a microcomputer such as a micro processing unit (MPU) or a micro controller unit (MCU)). Moreover, all or any of the processing may be performed by a program analyzed and executed by the CPU (or a microcomputer such as an MPU or an MCU) or may be performed by hardware by wired logic.

Figure 15:
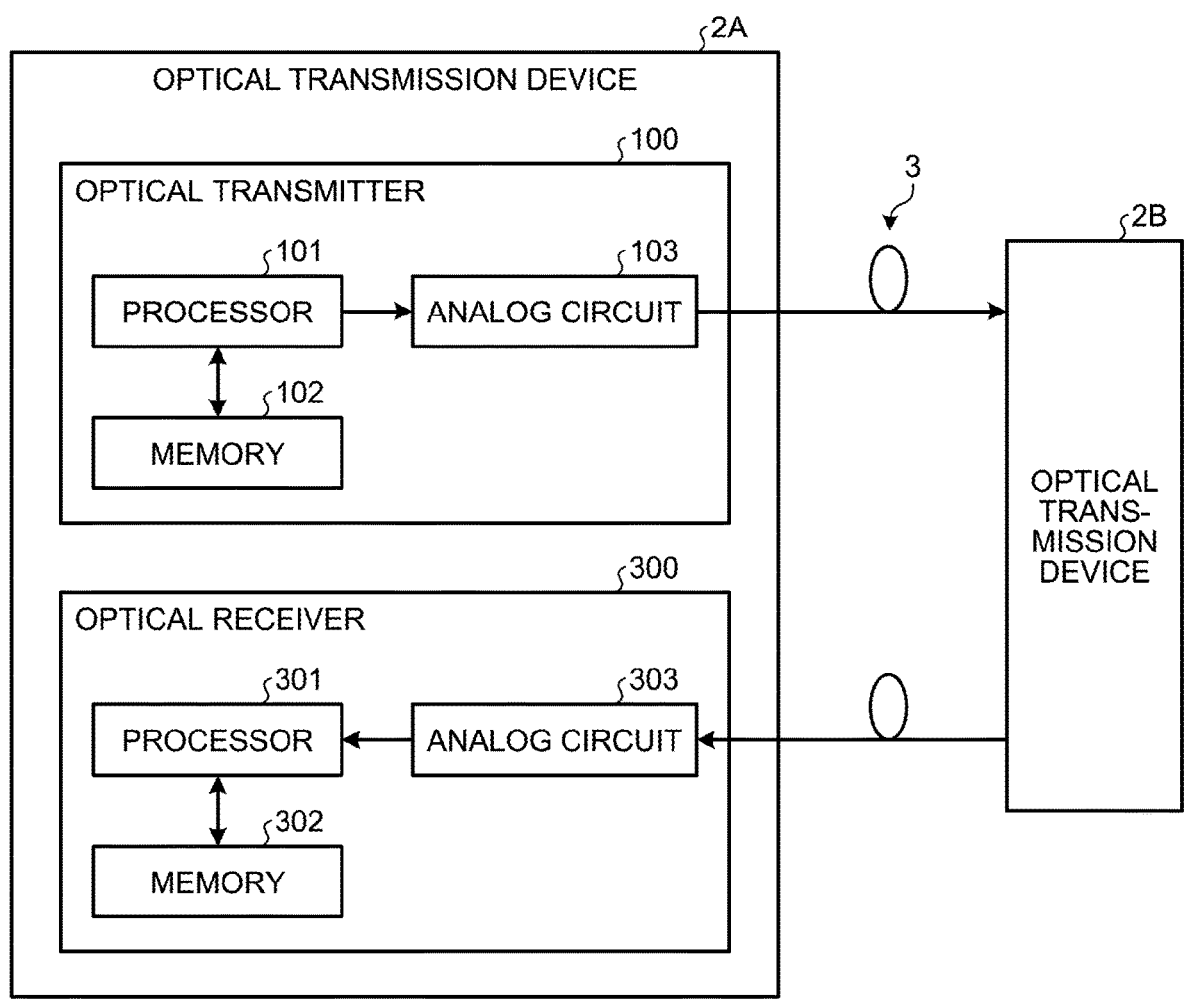
FIG. 15 is a diagram illustrating an example hardware configuration of the optical transmission system according to the embodiment.

The optical transmission system according to the embodiment may be realized by a hardware configuration as described below, for example. FIG. 15 is a diagram illustrating an example hardware configuration of the optical transmission system according to the embodiment.

As illustrated in FIG. 15, an optical transmitter 100 of each of the optical transmission devices 2A, 2B of the optical transmission system according to the embodiment includes a processor 101, a memory 102, and an analog circuit 103. Examples of the processor 101 include a CPU, a digital signal processor (DSP), and a field programmable gate array (FPGA). Furthermore, examples of the memory 102 include a random access memory (RAM), such as a synchronous dynamic random access memory (SDRAM), a read only memory (ROM), and a flash memory.

Furthermore, each processing to be performed by the optical transmitter 100 may be performed by a processor executing a program stored in various memories, such as a non-volatile storage medium. That is, programs corresponding to processes to be performed by the DMT modulator 11 and the controller 50 may be recorded in the memory 102, and each program may be executed by the processor 101. Moreover, the DAC 12 and the E/O module 13 are realized by the analog circuit 103.

As illustrated in FIG. 15, an optical receiver 300 of each of the optical transmission devices 2A, 2B of the optical transmission system according to the embodiment includes a processor 301, a memory 302, and an analog circuit 303. Examples of the processor 301 include a CPU, a DSP, and an FPGA. Furthermore, examples of the memory 302 include a RAM, such as an SDRAM, a ROM, and a flash memory.

Furthermore, each processing to be performed by the optical receiver 300 may be performed by a processor executing a program stored in various memories, such as a non-volatile storage medium. That is, programs corresponding to processes to be performed by the DMT demodulator 33 and the controller 50 may be recorded in the memory 302, and each program may be executed by the processor 301. Moreover, the O/E module 31, and the ADC 32 are realized by the analog circuit 303.

Additionally, various processes to be performed by the optical transmission system according to the embodiment are described to be performed by one processor, but this is not restrictive, and the processes may be performed by a plurality of processors.

According to one aspect, a system is reliably activated, and transmission characteristics are improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission device comprising:
an optical transmitter that transmits, at a time of system activation, a control signal to another optical transmission device by using a plurality of subcarriers; and
a controller that allocates a link communication channel (LCC) to a subcarrier which has a lowest transmission characteristic, among the plurality of subcarriers which have transmission characteristics above a predetermined reference, based on a response to the control signal from the other optical transmission device.

2. The optical transmission device according to claim 1, wherein the controller includes
a transmission characteristic acquirer that performs negotiation with the other optical transmission device by using at least one subcarrier, among the plurality of subcarriers, for which a response to the control signal is received from the other optical transmission device, and that acquires a transmission characteristic of the at least one subcarrier for which the response is received, and
an LCC allocator that allocates the LCC to the subcarrier for which the lowest transmission characteristic is obtained, among the at least one subcarrier for which the response is received.

3. The optical transmission device according to claim 2, wherein the LCC allocator
determines whether or not the transmission characteristic of the at least one subcarrier for which the response is received is above the predetermined reference, and
allocates the LCC to the subcarrier which has the lowest transmission characteristic, among subcarriers with the transmission characteristic above the predetermined reference.

4. The optical transmission device according to claim 1, wherein
the controller includes
a frequency response characteristic calculator that calculates, by an arithmetic equation that uses a degree of modulation, a parameter of a frequency chirp of the optical transmitter, a wavelength of a modulated optical signal, a wavelength dispersion value, a transmission distance, a frequency, and a light speed, a frequency response characteristic representing a relationship between the frequency and a relative intensity of the modulated optical signal,
a dip frequency identifier that identifies a first dip frequency that is a lowest frequency at which a local minimum in the relative intensity occurs in the frequency response characteristic, and
a subcarrier selector that sequentially selects a subcarrier at an interval corresponding to the first dip frequency, from the plurality of subcarriers, and
the optical transmitter transmits the control signal for each subcarrier selected by the subcarrier selector.

5. An optical transmission system comprising first and second optical transmission devices, wherein
the first optical transmission device includes
an optical transmitter that transmits, at a time of system activation, a control signal to the second optical transmission device by using a plurality of subcarriers, and
a controller that allocates a link communication channel (LCC) to a subcarrier which has a lowest transmission characteristic, among the plurality of subcarriers which have transmission characteristics above a predetermined reference, based on a response to the control signal from the second optical transmission device.

6. An allocation method comprising:
transmitting, by an optical transmission device, at a time of system activation, a control signal to another optical transmission device by using a plurality of subcarriers; and
allocating, by the optical transmission device, a link communication channel (LCC) to a subcarrier which has a lowest transmission characteristic, among the plurality of subcarriers which have transmission characteristics above a predetermined reference, based on a response to the control signal from the other optical transmission device.

* * * * *